United States Patent
Wilson

(10) Patent No.: US 9,350,420 B1
(45) Date of Patent: May 24, 2016

(54) DETERMINING DOWNSTREAM POWER BACK-OFF PARAMETERS

(71) Applicant: Adtran Inc., Huntsville, AL (US)

(72) Inventor: Arlynn W. Wilson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 14/547,823

(22) Filed: Nov. 19, 2014

(51) Int. Cl.
| | |
|---|---|
| H04M 1/24 | (2006.01) |
| H04M 3/08 | (2006.01) |
| H04M 3/22 | (2006.01) |
| H04B 3/32 | (2006.01) |
| H04M 3/34 | (2006.01) |
| H04B 3/487 | (2015.01) |

(52) U.S. Cl.
CPC ............. H04B 3/32 (2013.01); H04B 3/487 (2015.01); H04M 3/34 (2013.01)

(58) Field of Classification Search
CPC . H04M 11/062; H04M 3/2209; H04M 3/306; H04M 3/305; H04M 1/24; H04M 3/30; H04M 3/304; H04M 3/308
USPC .................................. 379/1.01, 1.03, 1.04
See application file for complete search history.

(56) References Cited

U.S. PATENT DOCUMENTS

| | | | | |
|---|---|---|---|---|
| 7,242,761 | B1 * | 7/2007 | Milbrandt | H04B 3/46 375/227 |
| 7,809,116 | B2 * | 10/2010 | Rhee | H04B 3/48 379/1.03 |
| 2012/0275576 | A1 * | 11/2012 | Wei | H04B 3/32 379/32.04 |

* cited by examiner

*Primary Examiner* — Quoc D Tran
(74) *Attorney, Agent, or Firm* — Fish & Richardson P.C.

(57) ABSTRACT

Methods, systems, and apparatus for determining values of downstream power back-off parameters are disclosed. In one aspect, a method includes receiving cable loss data of a cable configured to deliver a digital subscriber line (DSL) signal; identifying a cable model that characterizes a cable loss value at a frequency over a length of the cable; and determining a set of downstream power back-off (DPBO) parameter values of the cable model based on a product of a pseudo-inverse of a frequency matrix including a plurality of different frequencies and a vector of the cable loss data that includes a plurality of cable loss values with respect to the plurality of different frequencies of the pseudo-inverse of the frequency matrix.

22 Claims, 3 Drawing Sheets

DETERMINING DOWNSTREAM POWER BACK-OFF PARAMETERS

BACKGROUND

This specification relates to data transmissions in a telecommunications environment.

As demand for network services increases, access network providers are implementing new technologies to provide access network services to more subscribers and/or to provide more services to at least some of the subscribers. In some implementations, the access network providers can utilize at least a portion of their legacy access network infrastructure to deploy additional (e.g., higher bandwidth) services, while keeping existing access networks that they have been using to provide services to subscribers.

SUMMARY

In general, one innovative aspect of the subject matter described in this specification can be embodied in methods that include receiving cable loss data of a cable configured to deliver a digital subscriber line (DSL) signal; identifying a cable model that characterizes a cable loss value at a frequency over a length of the cable; and determining a set of downstream power back-off (DPBO) parameter values of the cable model based on a product of a pseudo-inverse of a frequency matrix including a plurality of different frequencies and a vector of the cable loss data that can include a plurality of cable loss values with respect to the plurality of different frequencies of the pseudo-inverse of the frequency matrix.

Another innovative aspect of the subject matter described in this specification can be embodied in a device that includes a memory storing instructions executable by one or more processors; one or more data processing devices configured to interact with the memory and execute the instructions that cause the device to be configured to: receive cable loss data of a cable configured to deliver a digital subscriber line (DSL) signal; identify a cable model that characterizes a cable loss value at a frequency over a length of the cable; and determine a set of downstream power back-off (DPBO) parameter values of the cable model based on a product of a pseudo-inverse of a frequency matrix including a plurality of different frequencies and a vector of the cable loss data that can include a plurality of cable loss values with respect to the plurality of different frequencies of the pseudo-inverse of the frequency matrix.

Another innovative aspect of the subject matter described in this specification can be embodied in a system that includes a network including a plurality of devices; and one or more data processing devices configured to: receive cable loss data of a cable configured to deliver a digital subscriber line (DSL) signal; identify a cable model that characterizes a cable loss value at a frequency over a length of the cable; and determine a set of downstream power back-off (DPBO) parameter values of the cable model based on a product of: a pseudo-inverse of a frequency matrix including a plurality of different frequencies and a vector of the cable loss data that can include a plurality of cable loss values with respect to the plurality of different frequencies of the pseudo-inverse of the frequency matrix.

These and other embodiments can each optionally include one or more of the following features. Methods can include the action of determining a downstream power spectrum density (PSD) mask based on the set of DPBO parameter values.

The cable model can be represented by $(DPBOESCMA + DPBOESCMB \cdot \sqrt{f} + DPBOESCMC \cdot f) DPBOESEL$; wherein f represents frequency and DPBOESEL represents the length of the cable, and the set of DPBO parameter values can include values of DPBOESCMA, DPBOESCMB, and DPBOESCMC.

Methods can include the action of determining a downstream power spectrum density (PSD) mask based on the set of DPBO parameters according to:

$$DPBOEPSD(f) \cdot (DPBOESCMA + DPBOESCMB \cdot \sqrt{f} + DPBOESCMC \cdot f) DPBOESEL,$$

wherein DPBOEPSD (f) represents a PSD mask without downstream power back-off.

Receiving cable loss data of a cable can include receiving cable loss data of a cable based on a dual ended line test (DELT).

Receiving cable loss data of a cable can include receiving cable loss data of a cable based on insertion loss measurements using a test device.

Receiving cable loss data of a cable can include receiving cable loss data of a cable based on estimation of loss loop characteristics from loop records.

Particular embodiments of the subject matter described in this specification can be implemented so as to realize one or more of the following advantages. The example techniques described herein can allow co-existence of legacy access technologies (e.g., asymmetric digital subscriber line (ADSL)) and new access technologies (e.g., very-high-bit-rate digital subscriber line (VDSL)) that share common transmission media (e.g., twisted pair links). The example techniques described herein can facilitate the ability to provide satisfactory services using each of the technologies over a same wire binder that includes multiple twisted pair cables. In particular, the example techniques provide computationally efficient implementations for determining cable model parameters for downstream power back-off (DPBO), and can provide more accurate estimation of the cable model parameters by using a large number of cable loss data points. Accordingly, more effective DPBO can be performed based on the determined cable model parameters. These more accurate estimated cable model parameters can reduce crosstalk between ADSL and VDSL signals that are transmitted over a same wire binder. In some implementations, the example techniques can be implemented as an automated process or application compatible with various network protocols and can be efficiently implemented and executed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
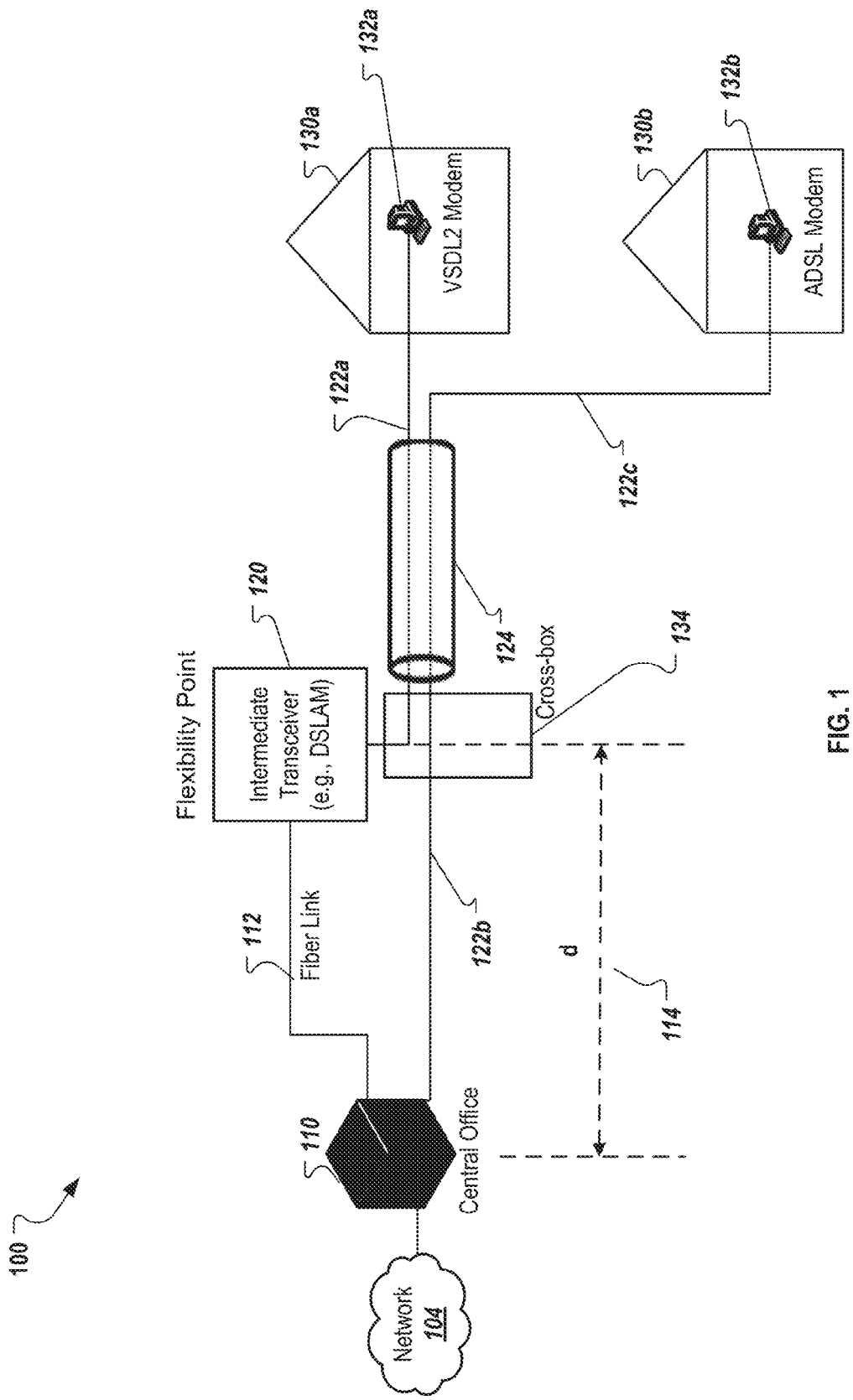
FIG. 1 is a block diagram of an example telecommunications network.

This document discusses techniques that can be used when deploying higher bandwidth services such as very-high-bitrate digital subscriber line (VDSL), for example, in a localized distribution area (DA) that includes subscribers who were originally served from a Central Office (CO) (e.g., outside of the distribution area) using legacy services such as asymmetric digital subscriber line (ADSL). The VDSL can utilize at least a portion of the existing infrastructure (e.g., copper wires) of the legacy ADSL access network for delivering, to the subscribers, higher speed internet access than that provided by the legacy ADSL access network. For example, the VDSL signals can be generated at an intermediate location between a CO and a subscriber premises. The intermediate location is also referred to as an injection point or flexibility point in ITU-T Recommendation G.997.1. For brevity, this document will refer to the intermediate location as a flexibility point. The VDSL signal can be injected into a subscriber line (e.g., a twisted pair cable) that was previously used to transmit an ADSL signal. As such, the VDSL signal and the ADSL signal can share the same transmission media (e.g., using twisted pair cables in the same wire binder) from the flexibility point to the subscriber premises.

In order to deploy VDSL and ADSL over twisted pairs that are in the same binder, it may be necessary to control the transmit power of the VDSL signal so that the VDSL signal does not overwhelm the ADSL signal. In some instances, the ADSL signal that originated from the CO may have been impaired and/or attenuated during the transmission from the CO to the flexibility point. Therefore, the transmit power of the VDSL signal injected at the flexibility point can be selected, based at least in part, on the amount of impairment/attenuation that the ADSL signal experiences during the transmission from the CO to the flexibility point to reduce, for example, the crosstalk between the VDSL signal and ADSL signal.

Downstream power back-off (DPBO) can be used to control/adjust the transmit power of the VDSL signal that is injected at the flexibility point. In some implementations, DPBO can be performed by the intermediate transceiver at the flexibility point to reduce or otherwise control the transmit power of the VDSL signal. Controlling the transmit power using DPBO can include determining and applying a transmit power spectral density (PSD) mask to suppress, attenuate, or otherwise modify the transmit PSD of the VDSL signal, for example, to ensure the VDSL signal has the same or a comparable power level relative to the ADSL signal (e.g., within a specified amount of the ADSL power level). The transmit PSD mask can be determined, for example, based on the amount of attenuation experienced by the ADSL signal from the CO to the flexibility point.

In some instances, the attenuation experienced by the ADSL signal can be referred to as cable loss, which is commonly referred to as insertion loss, or any other reductions or impairments of the signal that are caused as the signal travels over a cable or conductor. The cable loss of a signal can depend on a transmission frequency, transmission distance (or cable length), cable type, cable mode, or other factors. For example, for an ADSL signal transmitted over a particular bandwidth, the cable loss values of the ADSL signal can be different at different frequencies across the bandwidth.

In some instances, a cable model (or a simplified model) can be used to characterize the cable loss of a signal transmitted at a particular frequency over a given length of a cable. The characterized cable loss can be expressed, for example, as one or more cable loss values specifying an amount of cable loss experienced by the signal. The cable model can include multiple parameters that help quantify a specific cable loss value for a given frequency and cable length. As the cable loss relies on various implementation factors, a single set of fixed or default cable loss parameters may provide less than a desired level (or required level) of accuracy with respect to cable loss values for all cables and/or wire binders in one or more distribution areas of a telecommunications network. A higher level of cable loss value accuracy may be achieved, for example, by determining or calibrating cable model parameters of each particular distribution area, for example, based on the cable loss data of each particular distribution area of the telecommunications network. The higher level of cable loss accuracy can be used to improve the reliability of the telecommunications network, for example, by reducing the crosstalk between the ADSL and VDSL signals.

Example techniques for determining values of a set of cable model parameters for performing DPBO are described in more detail below. For brevity, the cable model parameters for performing DPBO are referred to as DPBO parameters in this document. In some implementations, the values of the DPBO parameter can be determined based on measured or estimated cable loss data that are obtained, for example, based on a dual ended line test (DELT), insertion loss measurements detected by test equipment, estimation of loss loop characteristics from loop records, or other sources.

In some implementations, the example techniques provide a computationally efficient solution for determining DPBO parameter values based on a large number of data loss data values. Specifically, the example techniques enable a direct computation of the DPBO parameter values based on a product of a pseudo-inverse of a frequency matrix and a vector of the cable loss data. Based on the determined DPBO parameter values, the cable loss of ADSL signals across its occupied bandwidth over a given transmission distance can be estimated. Accordingly, the DPBO can be applied to the VDSL signal based on the determined cable loss of the ADSL signal.

The example techniques described herein can be implemented as, or in, methods, computer program products, apparatus, devices, etc., for example, to perform DPBO and manage crosstalk between co-existing ADSL and VDSL signals transmitted over twisted pair cables that are in a same wire binder.

Throughout this document, ADSL is used as an example legacy technology while VDSL is used as an example forward-deployed technology. ADSL can include ADSL, ADSL2, ADSL2+, ADSL2++, or other versions. Similarly, VDSL can include VDSL defined in standard International Telecommunication Union (ITU) G.993.1, VDSL2 defined in standard ITU G.993.2, or other versions. These technologies are used for purposes of illustration, and are not intended to limit the scope of this document. The example techniques described herein can be applied to additional or different access technologies and telecommunications networks that share common transmission media.

Throughout this document, the terms downlink, downstream (DS), and downstream communications are used to refer to communications transmitted toward the end user or subscriber, while the terms uplink, upstream (US), and upstream communications are used to refer to communications transmitted toward the service provider (e.g., a telecommunications service provider's central office).

Figure 2:
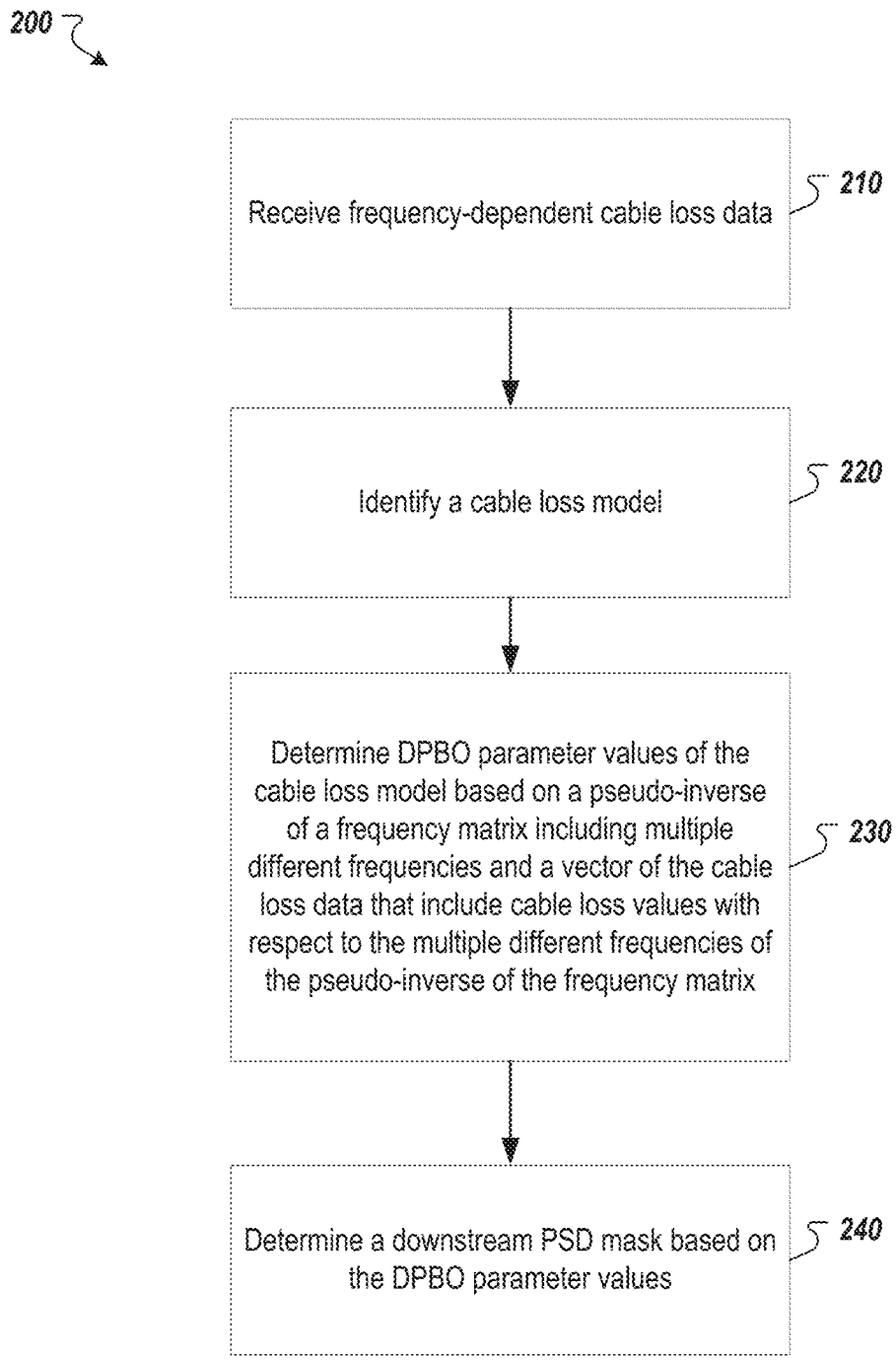
FIG. 2 is a flow chart of an example process for determining downstream power back-off (DPBO) parameters.
Figure 3:
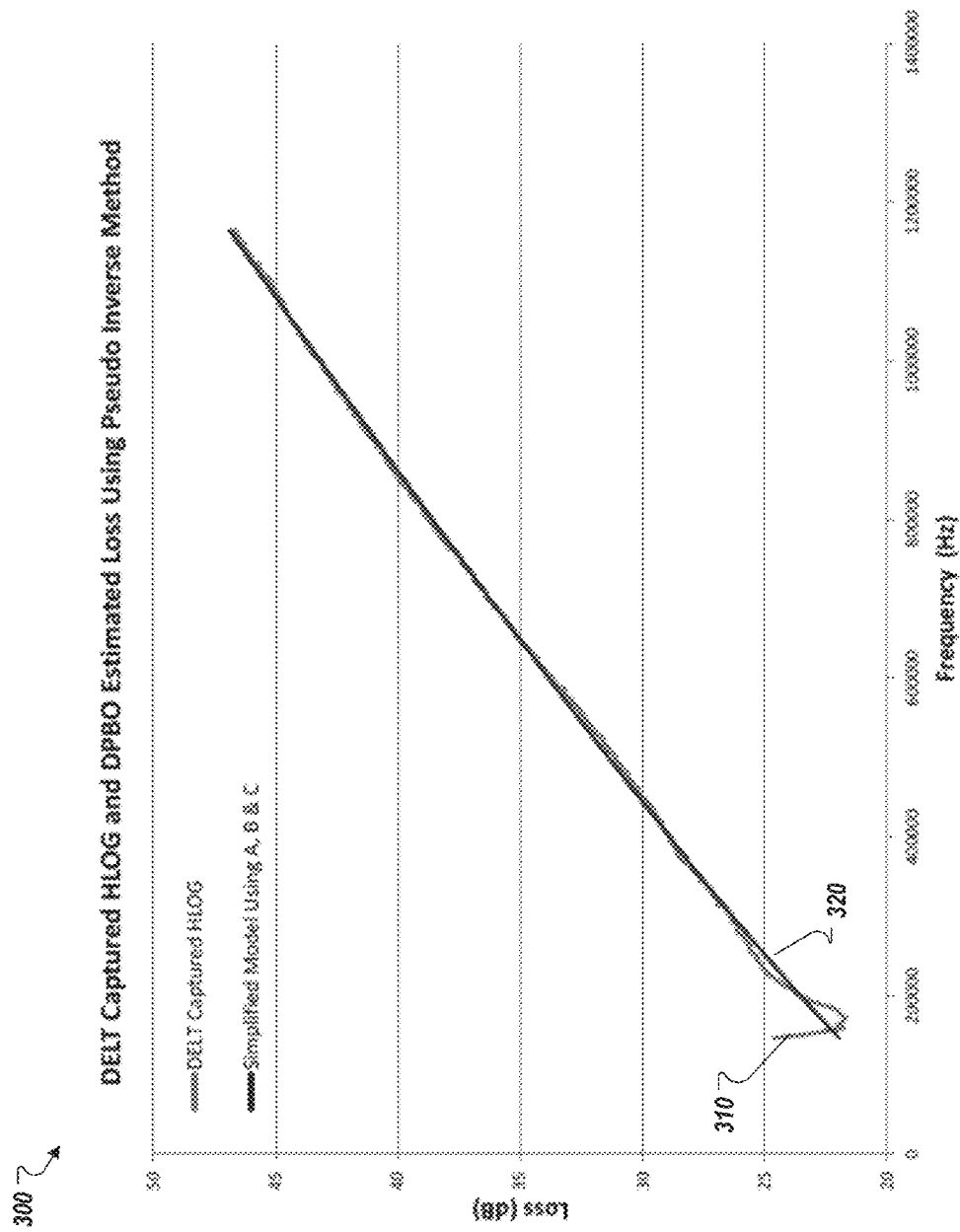
FIG. 3 is a plot showing example measured cable loss values and estimated cable loss values based on the DPBO parameters determined according to an implementation.

The discussion that follows with reference to FIG. 1 introduces components of an example telecommunications network that can be configured to determine DPBO parameters and perform DPBO. The description referencing FIG. 2 provides details regarding an example method for performing DPBO. Particularly, details of example techniques for determining DPBO parameters are described. FIG. 3 is a plot showing simulation results of an application of the example method for determining DPBO parameters described in FIG. 2.

FIG. 1 is a block diagram of an example telecommunications network 100. In some implementations, the telecommunications network 100 utilizes a combination of fiber optic cables (e.g., fiber link 112) and twisted pair cables (e.g., twisted pair cables 122a, 122b, 122c) to provide network services (e.g., xDSL services) to subscribers. In the example shown in FIG. 1, the telecommunications network 100 deploys both legacy services such as ADSL and higher bandwidth services such as VDSL. The telecommunications network 100 includes a central office 110 (also referred to as an exchange), an intermediate transceiver 120, and multiple customer-premises equipment (CPE) (e.g., VSDL2 modem 132a and ADSL modem 132b) at end user locations 130a and 130b. The end user locations 130a and 130b can also be referred to as customer/subscriber premises. The telecommunications network 100 can include additional or different components and features and can be configured in a different manner than the example telecommunications network 100 in FIG. 1.

As shown in FIG. 1, the central office 110 is coupled to a network 104 that can be the Internet, an internet service provider (ISP) network, a public switched telephone network (PSTN), an Internet Protocol television (IPTV) network, or another network that provide various network services such as voice, video, data, or a combination of them. The central office 110 can be connected to a CPE directly or through the intermediate transceiver 120.

For example, the central office 110 is connected to the ADSL modem 132b at customer premises 130b using twisted pair cables 122b and 122c that originate at the central office 110. The twisted pair cable 122b can be used to establish an ADSL connection between the central office 110 and the ADSL modem 132b. Typically, there is a crossbox 134 in the field where the VDSL signal at the intermediate injection location 120 joins the ADSL signal originating from the CO 110. The first section of twisted pair cable from the CO 110 to the crossbox 134 is called the F1 cable (e.g., cable 122b) and the twisted pairs where the two DSLs coexists after the crossbox 134 is called the F2 cable (e.g., cable 122c). Thus, ADSL signals generated at the central office 110 can be transmitted over the twisted pair cables 122b and 122c to the ADSL modem 132b at the customer premises 130b.

The central office 110 is also connected to the intermediate transceiver 120 by the fiber link 112, and the intermediate transceiver 120 is further connected to the VSDL2 modem 132a at customer premises 130a using the twisted pair cables 122a. In this case, a VSDL connection is established between the intermediate transceiver 120 and the VSDL2 modem 132a using the twisted pair cables 122a. In general, the intermediate transceiver 120 can be installed at various locations, such as at a network facility (e.g., at or near the central office CO 110), a remote node, a cabinet, a hub near the customer premises, or any intermediate point between the central office 110 and the customer premises 130a, 130b.

The intermediate transceiver 120 can be implemented, for example, as one or more of a digital subscriber line access multiplexer (DSLAM), a VTUC (downstream VDSL) transmitter, or another device. In general, the DSLAM can connect a high-speed network line (e.g., the fiber link 112) to multiple subscriber lines (e.g., the twisted pair cables 122a) and establish a VDSL connection between the DSLAM and a VDSL modem over each of the subscriber line. The DSLAM can, in the downstream direction, de-multiplex a high-speed data stream from the high-speed network line into multiple subscriber data streams and route the data streams over the twisted pair cables to multiple subscribers. For example, the DSLAM 120 in FIG. 1 can generate a VDSL signal based on the input signal from the fiber optic link 112 and transmit the VDSL signal over the twisted pair cables 122a to the VDSL modem 132a at the customer premises 130a. In the upstream direction, the DSLAM 120 can multiplex the data streams from the subscriber lines for transmission across the fiber link 112 to the central office 110.

In some implementations, the twisted pair cables 122a can share the same wire binder 124 with a portion of the twisted pair cables (e.g., the twisted pair cable 122c) between the intermediate transceiver 120 and the customer premises (e.g., the ADSL modem 132b). In some instances, the ADSL signal transmitted over the twisted pair cable 122c can be degraded by signal attenuation, loop insertion loss, or other cable loss over the electrical distance d 114 between the central office 110 and the intermediate transceiver 120. The electrical distance d 114 can represent the length of the twisted pair cable 122b between the central office 110 and the intermediate transceiver 120. To avoid the ADSL signal being overwhelmed by the VSDL signal generated at the intermediate transceiver 120 and to reduce crosstalk between the ADSL signal and the VSDL signal within the wire binder 124, the intermediate transceiver 120 can perform DPBO to control the power of the VSDL signal injected at the intermediate transceiver 120. In some implementations, the power of the VDSL signal can be set to a specified power level. For example, the VDSL signal can be set to a power level that is the same or within a specified amount relative to the power level of the ADSL signal at the intermediate transceiver 120 (e.g., at the distance d from the central office 110).

As discussed in more detail below, using DPBO to control the power of the VDSL signal can require an estimation of DPBO parameter values. In some implementations, these parameters need to be accurate enough to provide an expected or required quality of service (QoS). Example techniques for estimating DPBO parameters in an accurate and computationally efficient manner are described below.

FIG. 2 is a flow chart of an example method 200 for performing downstream power back-off (DPBO). The method 200 can be performed, for example, using various devices discussed above with respect to FIG. 1, or any other appropriate devices. As an example, the example method 200 can be performed by the intermediate transceiver 120 (e.g., by an ADSL Transceiver Unit Remote "ATUR" (downstream ADSL receiver)), or a controller (e.g., a computer) coupled to the intermediate transceiver 120. In some implementations, the example method 200 can be performed upon network initialization, reconfiguration, reset, or other system changes. The example method 200 can be performed periodically (e.g., at specified intervals for system maintenance) or from time to time (e.g., upon a request of a service provider or a network administrator).

Cable loss data of a cable configured to deliver a digital subscriber line (DSL) signal are obtained (210). The cable can be the example twisted pair cables 122b of FIG. 1 or another cable. The cable can be configured to deliver ADSL, VSDL, or other DSL signals.

The cable loss data can include frequency-dependent loss information (HLOG). For instance, the cable loss data can include cable loss values at one or more frequencies over one or more cable lengths. As an example, the cable loss data can include a vector of cable loss values corresponding to multiple different frequencies over the same electrical distance d 114 between the central office 110 and the intermediate transceiver 120. The cable loss data can be represented in other format (e.g., a matrix, a table, etc.) and can include additional or different attributes.

The cable loss data can be obtained based on tests, measurements, estimation, or other techniques. In some instances, the cable loss data can be obtained based on dual ended line test (DELT). For example, in order to determine the cable loss data (e.g., the cable loss data of the F1 cable section 122b) using the components in FIG. 1, an ADSL CPE modem can be placed at the location of the forward deployed DSLAM 120 and be connected with the CO 110 to a DSLAM port that is currently providing ADSL service to the neighborhood. The CO 110 can run DELT to provide the frequency dependent loss parameters associated with DELT. Alternatively, a test set measurement would be taken at the intermediate location 120 facing back towards the CO 110. In another implementation, test equipment can be placed at the CO 110 and at the injection point 120 to measure the loss in cable 122b. The HLOG results of the DELT diagnostics can provide cable loss values at different frequencies over the electrical distance d 114 between the CO 110 and the DSLAM 120.

In some instances, cable loss data can be obtained based on insertion loss measurements. For example, a test device or equipment can be used to collect a sweep of insertion loss measurements with respect to multiple frequencies over a certain cable length (e.g., the electrical distance between the CO 110 and the DSLAM 120).

In some instances, cable loss data of a cable can be obtained based on estimation of loop loss characteristics of the cable from loop records. For instance, service providers can have loop records that indicate topology, length, environment, cable types, or other configurations of the cables deployed in a network. For example, the loop records can include the lengths gauge of the cable and the presence of bridged taps and their respective lengths describing the actual loop topology of the F1 cable pair that connects the ADSL circuits from the CO to the intermediate location. The loop loss characteristics can be estimated by creating a well known two port equivalent lumped parameter model from the loop topology and calculating the insertion loss characteristics of the equivalent circuit. Based on the loop loss characteristics, cable loss values at different frequencies can be calculated.

A cable model that represents a cable loss value over a length of the cable is identified (220). In some instances, the cable model can characterize and quantify frequency-dependent cable losses of the cable using multiple DPBO parameters. An example cable model is given in relationship (1):

$$H(f) = (DPBOESCMA + DPBOESCMB \cdot \sqrt{f} + DPBOESCMC \cdot f) DPBOESEL \quad (1).$$

In the above relationship, H(f) represents a cable loss value (e.g., in dB) at a frequency f. DPBOESEL represents a length of the cable. The DPBOESEL can be, for example, the electrical distance d 114 between the CO 110 and the DSLAM 120 where the VSDL signal subject to DPBO is injected. DPBOESCMA, DPBOESCMB, and DPBOESCMC are three scalar DPBO parameters.

Given the values of the DPBO parameters, DPBOESCMA, DPBOESCMB, and DPBOESCMC, the cable loss value at an arbitrary frequency can be obtained according to the cable model. Accordingly, for DPBO, a power spectral density (PSD) mask that shapes the power spectrum of the VSDL signal injected at the intermediate transceiver 120 can be determined based on the cable model with the DPBO parameters.

A set of DPBO parameter values of the cable model are determined (230). For example, the DPBO parameters values can include the values of DPBOESCMA, DPBOESCMB, and DPBOESCMC of the example cable model in relationship (1). The DPBO parameter values can be determined based on the cable loss data obtained at 210, for example, by line/curve fitting or other mathematical manipulations.

In some implementations, the DPBO parameter values can be determined based on a product of a pseudo-inverse of a frequency matrix F and a vector of the cable loss data L. The cable loss vector L can include multiple cable loss values with respect to multiple different frequencies that correspond to the multiple different frequencies of the pseudo-inverse of the frequency matrix F.

For example, the vector of the cable loss data L can include N cable loss values, i.e., $L = [L_1, L_2, \ldots, L_N]^T$ with respect to N different frequencies $\{f_i, i=1, 2, \ldots, N\}$. The frequency matrix F can include a column of 1's, a column of square root of $\{f_i\}$ and a column of $\{f_i\}$, as shown in relationship (2):

$$F = \begin{bmatrix} 1 & \sqrt{f_1} & f_1 \\ \vdots & \vdots & \vdots \\ 1 & \sqrt{f_N} & f_N \end{bmatrix}. \quad (2)$$

In some implementations, normalization of the frequency-dependent parameters can be performed based on the fixed frequency for which DPBOESEL is chosen. As an example, if the frequency corresponding to DPBOESEL is 1 MHz, the frequencies can be normalized to the frequency used to define DPBOESEL (e.g., MHz).

In order to estimate values of DPBOESCMA, DPBOESCMB, and DPBOESCMC (denoted as A, B and C in below equations) of this cable, the cable model in relationship (1) can be rewritten as:

$$F \times \begin{bmatrix} A \\ B \\ C \end{bmatrix} \approx \frac{1}{L_{1MHz}} \begin{bmatrix} L_1 \\ \vdots \\ L_N \end{bmatrix}; \quad (3)$$

$$L_{1MHz} = DPBOESEL \quad (4).$$

The values of parameters DPBOESCMA, DPBOESCMB, and DPBOESCMC can be calculated based on a product of the pseudo-inverse of F and the vector of the cable loss data L, for example, as shown in relationship (5). Note that the vector L can include more than three frequency-dependent cable loss values (i.e., N>3).

$$\begin{bmatrix} A \\ B \\ C \end{bmatrix} \approx \frac{1}{L_{1MHz}} (F^T F)^{-1} F^T \begin{bmatrix} L_1 \\ \vdots \\ L_N \end{bmatrix}. \quad (5)$$

Different variations and modifications of the above example techniques can be implemented. The example techniques enable a computationally efficient and direct calculation of the DPBO parameter values. By using the matrix-vector product, the example techniques can compute the DPBO parameter values based on a large number of cable loss values at once without iterations. For instance, the cable loss data obtained by DELT HLOG data can include tens or hundreds of cable loss values at different frequencies that span a spectrum of interest. These cable loss values can be arranged in a vector L, and a frequency matrix F can be constructed based on the corresponding frequencies of the cable loss values according to the relationship (2). DPBO parameter values can then be efficiently computed according to relationship (5) based on the tens or hundreds of cable loss values. In some instances, the more cable loss values, the more accurate the DPBO parameter values can be obtained, resulting in more effective implementation of DPBO.

A downstream PSD mask is determined based on the set of DPBO parameter values (240). In some instances, determining a downstream PSD mask can include determining an estimated attenuated PSD mask. The estimated attenuated PSD mask can be, for example, an estimation of the PSD mask of the ADSL signal at the flexibility point. In some implementations, the predicted attenuated PSD mask, denoted as EPSD (f) can be given by:

$$EPSD(f)=DPBOEPSD(f)-(DPBOESCMA+DPBOESCMB \cdot \sqrt{f}+DPBOESCMC \cdot f)DPBOESEL \quad (6).$$

Here, DPBOEPSD (f) can represent a PSD mask without downstream power back-off (e.g., a transmitted PSD at the CO). The values of parameters DPBOESCMA, DPBOESCMB, and DPBOESCMC obtained at 230 can be substituted into relationship (6) for calculating the predicted attenuated PSD mask EPSD(f). In some instances, the predicted attenuated PSD mask EPSD (f) can be regarded as the transmitted PSD at the CO minus the attenuation of the signal experienced during the transmission from the CO to the flexibility point.

In some implementations, determining a downstream PSD mask can include determining a downstream backed-off PSD mask, denoted as DPBOPSD. The downstream backed-off PSD mask can be, for example, a PSD mask of the VDSL signal to be transmitted by the intermediate transceiver 120 at the flexibility point that is subject to DPBO. In some implementations, the downstream backed-off PSD mask can be determined based on the predicted attenuated PSD mask, EPSD(f). In some implementations, the downstream backed-off PSD mask can be further determined based on a frequency range (e.g., with a maximum and/or minimum frequency), a maximum magnitude, a PSD mask override, or other factors.

In some implementations, the intermediate transceiver 120 can perform DPBO by applying the downstream backed-off PSD mask to the VDSL signal (e.g., as the transmit PSD mask). As such, the power level of the VDSL signal is reduced or controlled based on the cable loss of the coexisting ADSL signal. In some implementations, additional or different techniques can be used to perform DPBO of the VDSL signal based on the determined DPBO parameter values.

FIG. 3 is a plot 300 showing example measured cable loss values and estimated cable loss values based on the DPBO parameters determined according to an implementation. FIG. 3 shows the example cable loss values in dB over frequencies ranging from less than 0.2 MHz to about 1.20 MHz. Specifically, the curve 310 represents the example cable loss values obtained based on HLOG results captured by DELT. The curve 320 represents the estimated cable loss values using the example signal model in relationship (1) based on the DPBO parameter values that are determined according to the example method 200 described in FIG. 2. As illustrated, the estimated cable loss values 320 accurately represent the measured cable loss values 310 across the entire frequency band ranging from about 0.3 MHz to 1.20 MHz. The example results in FIG. 3 demonstrate the effectiveness of the example method 200 for determining DPBO parameter values that are based on a product of a pseudo-inverse of a frequency matrix F and a vector of the cable loss data L.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   receiving cable loss data of a cable configured to deliver a digital subscriber line (DSL) signal;
   identifying a cable model that characterizes a cable loss value at a frequency over a length of the cable;
   obtaining cable loss values at a plurality of different frequencies;
   generating a frequency matrix of the plurality of different frequencies, wherein the frequency matrix comprises a plurality of columns, each column comprising the plurality of different frequencies each raised to a respective exponent; and
   determining a set of downstream power back-off (DPBO) parameter values of the cable model based on a product of a pseudo-inverse of the frequency matrix and a vector of the cable loss values.

2. The method of claim 1, further comprising determining a downstream power spectrum density (PSD) mask based on the set of DPBO parameter values.

3. The method of claim 1, wherein the cable model is represented by:

$$(DPBOESCMA+DPBOESCMB \cdot \sqrt{f}+DPBOESCMC \cdot f)DPBOESEL;$$

wherein f represents frequency and DPBOESEL represents the length of the cable, and the set of DPBO parameter values comprises values of DPBOESCMA, DPBOESCMB, and DPBOESCMC.

4. The method of claim 3, further comprising determining a downstream power spectrum density (PSD) mask based on the set of DPBO parameters according to:

$$DPBOEPSD(f)-(DPBOESCMA+DPBOESCMB \cdot \sqrt{f}+DPBOESCMC \cdot f)DPBOESEL,$$

wherein DPBOEPSD(f) represents a PSD mask without downstream power back-off.

5. The method of claim 1, wherein receiving cable loss data of a cable comprises receiving cable loss data of a cable based on a dual ended line test (DELT).

6. The method of claim 1, wherein receiving cable loss data of a cable comprises receiving cable loss data of a cable based on insertion loss measurements using a test device.

7. The method of claim 1, wherein receiving cable loss data of a cable comprises receiving cable loss data of a cable based on estimation of loss loop characteristics from loop records.

8. The method of claim 1, wherein the frequency matrix of the plurality of different frequencies comprises:
   a first vector comprising the plurality of different frequencies each raised to the exponent 0;
   a second vector comprising the plurality of different frequencies each raised to the exponent ½; and
   a third vector comprising the plurality of different frequencies each raised to the exponent 1.

9. A device, comprising:
   a memory storing instructions executable by one or more processors;
   one or more data processing devices configured to interact with the memory and execute the instructions that cause the device to be configured to:
      receive cable loss data of a cable configured to deliver a digital subscriber line (DSL) signal;
      identify a cable model that characterizes a cable loss value at a frequency over a length of the cable;
      obtain cable loss values at a plurality of different frequencies;
      generate a frequency matrix of the plurality of different frequencies, wherein the frequency matrix comprises a plurality of columns, each column comprising the plurality of different frequencies each raised to a respective exponent; and
      determine a set of downstream power back-off (DPBO) parameter values of the cable model based on a product of a pseudo-inverse of the frequency matrix and a vector of the cable loss values.

10. The device of claim 9, further configured to determine a downstream power spectrum density (PSD) mask based on the set of DPBO parameter values.

11. The device of claim 9, wherein the cable model is represented by:

$$(DPBOESCMA + DPBOESCMB \cdot \sqrt{f} + DPBOESCMC \cdot f)DPBOESEL;$$

wherein f represents frequency and DPBOESEL, represents the length of the cable, and the set of DPBO parameter values comprises values of DPBOESCMA, DPBOESCMB, and DPBOESCMC.

12. The device of claim 11, further configured to determine a downstream power spectrum density (PSD) mask based on the set of DPBO parameters according to:

$$DPBOEPSD(f) - (DPBOESCMA + DPBOESCMB \cdot \sqrt{f} + DPBOESCMC \cdot f)DPBOESEL,$$

wherein DPBOEPSD(f) represents a PSD mask without downstream power back-off.

13. The device of claim 9, wherein the cable loss data of a cable comprises cable loss data of a cable obtained based on a dual ended line test (DELT).

14. The device of claim 9, wherein the cable loss data of a cable comprises cable loss data of a cable obtained based on insertion loss measurements using a test device.

15. The device of claim 9, wherein the cable loss data of a cable comprises cable loss data of a cable obtained based on estimation of loss loop characteristics from loop records.

16. A system, comprising:
   a network including a plurality of devices; and
   one or more data processing devices configured to:
      receive cable loss data of a cable configured to deliver a digital subscriber line (DSL) signal;
      identify a cable model that characterizes a cable loss value at a frequency over a length of the cable;
      obtain cable loss values at a plurality of different frequencies;
      generate a frequency matrix of the plurality of different frequencies, wherein the frequency matrix comprises a plurality of columns, each column comprising the plurality of different frequencies each raised to a respective exponent; and
      determine a set of downstream power back-off (DPBO) parameter values of the cable model based on a product of a pseudo-inverse of the frequency matrix and a vector of the cable loss values.

17. The system of claim 16, wherein the one or more data processing devices is further configured to determine a downstream power spectrum density (PSD) mask based on the set of DPBO parameter values.

18. The system of claim 16, wherein the cable model is represented by:

$$(DPBOESCMA + DPBOESCMB \cdot \sqrt{f} \cdot DPBOESCMC \cdot f)DPBOESEL;$$

wherein represents frequency and DPBOESEL represents the length of the cable, and the set of DPBO parameter values comprises values of DPBOESCMA, DPBOESCMB, and DPBOESCMC.

19. The system of claim 18, wherein the one or more data processing devices is further configured to determine a downstream power spectrum density (PSD) mask based on the set ding to:

$$DPBOEPSD(f) - (DPBOESCMA + DPBOESCMB \cdot \sqrt{f} + DPBOESCMC \cdot f)DPBOESEL,$$

wherein DPBOPSD(f) represents a PSD mask without downstream power back-off.

20. The system of claim 16, wherein the cable loss data of a cable comprises cable loss data of a cable obtained based on a dual ended line test (DELT).

21. The system of claim 16, wherein the cable loss data of a cable comprises cable loss data of a cable obtained based on insertion loss measurements using a test device.

22. The system of claim 16, wherein the cable loss data of a cable comprises cable loss data of a cable obtained based on estimation of loss loop characteristics from loop records.

\* \* \* \* \*